Figure 1:
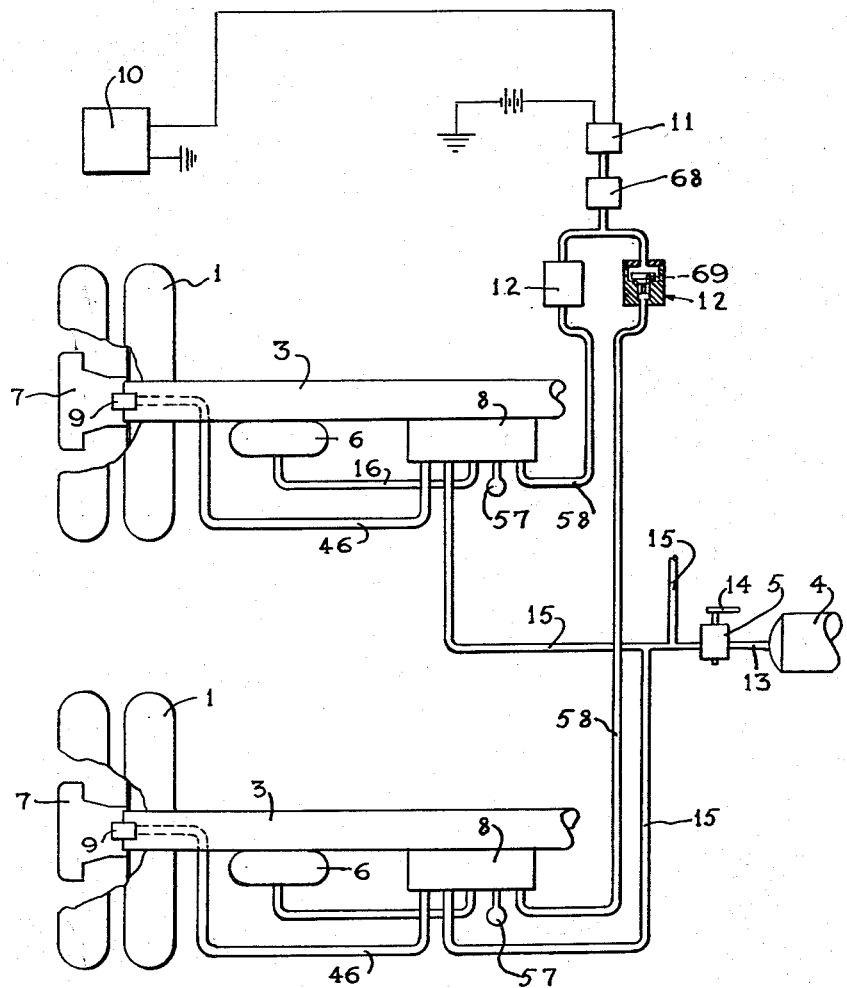

Dec. 4, 1956  C. DOOLITTLE  2,772,904
BRAKE CONTROL APPARATUS
Filed Dec. 29, 1954  2 Sheets-Sheet 1

INVENTOR.
Charles Doolittle
BY
Adelbert O. Stemmiller
ATTORNEY

Dec. 4, 1956
C. DOOLITTLE
2,772,904
BRAKE CONTROL APPARATUS
Filed Dec. 29, 1954
2 Sheets-Sheet 2
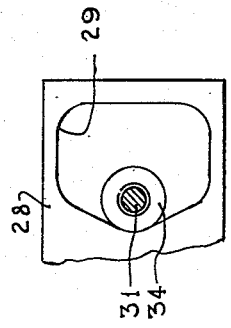
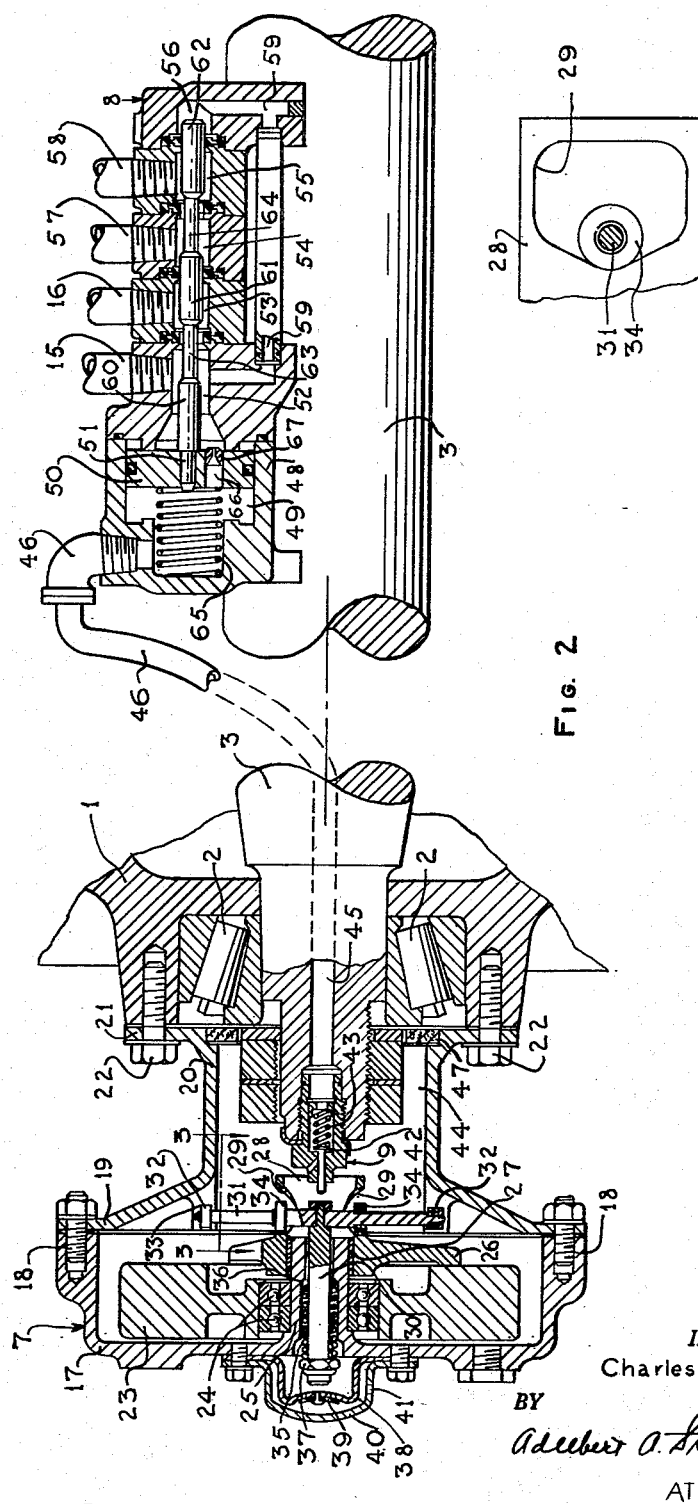
INVENTOR.
Charles Doolittle
BY
Adelbert A. Stemmler
ATTORNEY

United States Patent Office 2,772,904
Patented Dec. 4, 1956

2,772,904

BRAKE CONTROL APPARATUS

Charles Doolittle, Pittsburgh, Pa., assignor to Westinghouse Air Brake Company, Wilmerding, Pa., a corporation of Pennsylvania Application December 29, 1954, Serial No. 478,311

9 Claims. (Cl. 291—2)

This invention relates to brake control apparatus for vehicles, particularly automotive vehicles such as trucks, truck trailers and buses, and especially to control apparatus for preventing locking, that is sliding, of vehicle wheels resulting from operator-controlled brake applications, by automatically controlling release and reapplication of the wheel brakes.

Various devices and types of apparatus have heretofore been proposed for preventing the sliding of the wheels of automotive vehicles, that is the dragging of the wheels on the road surface in a locked state, caused by excessive brake application, as effected by the operator, in relation to the adhesion of the wheel tires to the road surface. It is especially desirable and necessary that sliding of wheels on trucks, buses and truck trailers be prevented in view of the great masses and weights involved. Sliding, or skidding as it is otherwise called, of truck trailer wheels, with the consequent jack-knifing of truck and truck trailer combinations which may result, is especially dangerous.

Up to the present time, suitable anti-wheel sliding or anti-wheel-skidding control device for automotive vehicles has not been commercially feasible because of the complexity of construction of the proposed devices, the difficulties of application thereof to existing trucks, buses and truck trailers, and also because of the excessive cost of the device and of its installation.

According to my present invention I have devised a novel control device, of the rotary inertia type, sensitive to acceleration and deceleration of automotive vehicle wheel, for detecting the slipping of the wheel at the instant it begins to decelerate to a locked condition, together with apparatus whereby said control device automatically releases the operator-applied brake application and then reapplies the brake, so as to prevent actual locking of the wheel or wheels. It will be understood that the term "slip" and its variants as used herein refers to the rotation of the vehicle wheel at a speed different from that corresponding to the linear speed of travel of the vehicle at a given instant. One of the features of my novel control device and apparatus lies in the fact that it may readily be installed within the hubs of existing truck-trailer wheels in a manner so as to completely avoid projecting beyond the outside face of the wheel tire. Another feature of my invention is the relative simplicity and ruggedness of construction which lessens the cost and reduces the necessity for maintenance and servicing and which lends itself to prolonged trouble-free service life. Another feature of my invention lies in a simplified control valve arrangement whereby brake control and sanding control are simultaneously effected under the control of the anti-wheel-sliding control device.

Accordingly, the principal object of my invention is to provide an anti-wheel-slide brake control apparatus of relatively simple construction which may be readily installed on new as well as existing automotive vehicles, such as truck trailers.

Another object of my invention is to provide an anti-wheel-slide control apparatus of the type indicated in the foregoing object, including a control device of the rotary inertia type, characterized by a novel construction and arrangement which combines simplicity and ruggedness of construction in a manner to provide long trouble-free service life, as well as a reasonably economic cost of manufacture.

Another object of my invention is to provide, in an anti-wheel-slide control apparatus of the type indicated in the foregoing objects, a simplified valve arrangement for simultaneously controlling the brakes and sanding.

Other objects and advantages of my invention will become apparent in the following more detailed description thereof when read in conjunction with the accompanying drawing wherein:

Fig. 1 is a horizontal diagrammatic view, in outline, showing a brake control apparatus embodying the invention as it may be applied to a truck-trailer, Fig. 2 is an enlarged elevational view, partly in section and partly in outline, showing details of the novel anti-wheel-slide controller device and associated control valve device, included in the apparatus shown in Fig. 1, and Fig. 3 is an enlarged fragmentary sectional view taken along line 3—3 of Fig. 2, showing a detail of a component part of the anti-wheel-slide controller device shown in Fig. 2.

*Description*

As shown in the drawings, the numeral 1 designates each of two sets of dual wheels for a truck-trailer, which wheels may be the front and rear wheels of a full trailer or those carried by dual axles of a tandem trailer, and each set is journaled in conventional manner by means of bearings 2 on a non-rotative axle 3.

The brake control apparatus embodying the invention and adapted for controlling the braking of the wheels 1, comprises a source of fluid under pressure 4, a manually operable brake control valve device 5, a brake cylinder device 6, an inertia operable control device 7, a control valve device 8, a pilot valve device 9, an electrically operable sanding device 10, a fluid pressure operable switch 11, and check valve devices 12.

The source of fluid under pressure 4 may be in the form of a reservoir, for example, which may be maintained charged by a compressor not shown.

The manually operable brake valve device 5 is located in the operator's cab of the tractor portion of the truck and is connected, as by a pipe 13, to the reservoir 4 and may be operated either by a hand lever 14 or a foot pedal (not shown) to control flow of fluid under pressure from the reservoir 4 to pipes 15 leading to the several valve devices 8. The valve device 5 is preferably of the well-known self-lapping type which, when the operating lever 14 is operated out of a brake release position to an application position in an application zone, will cause fluid pressure to flow to pipes 15 at a constant pressure proportional to the amount which said lever is moved out of its brake release position into the application zone.

Each brake cylinder device 6, carried conventionally by the axle 3, is supplied with fluid under pressure from the reservoir 4 through the corresponding valve device 8 and a pipe 16, in a manner to be hereinafter described, for operating brake shoes or elements (not shown) on the corresponding wheels 1.

As seen in Fig. 2, the inertia operable control device 7 for each wheel comprises a casing having an annular portion 17 substantially closed at one end and coaxially secured at its other end, as by a plurality of stud bolts and nuts 18 adjacent its outer periphery to a radially extending flange 19 provided at one end of a substantially cylindrical portion 20 of said casing of somewhat smaller diameter than said annular portion. At the end opposite flange 19, the casing portion 20 is provided with another radially extending flange 21 by which the control device 7 is coaxially and removably secured, as by a plurality of screws 22, to the outer face of the hub of wheel 1.

A flywheel 23 is journaled by anti-friction bearings 24 for rotation on an inwardly, coaxially extending tubular hub 25 within the casing portion 17, adjacent the closed end of said casing. A multi-fingered clutch member 26 is journaled on a sleeve bearing 27 on the inner end of the hub 25 for rotation thereon, the fingers of said clutch member extending radially therefrom and being adapted for frictionally engaging the adjacent face of the flywheel 23 for driving said flywheel. The clutch member 26 has an integral coaxially extending cylindrical and tubular cam portion 28 in which two continuous cam surfaces 29 are formed as by cutting openings diametrically opposite each other in the side walls of said tubular cam member, the contour of the openings providing the cam surfaces 29 being shown in Fig. 3. A spindle 30 extends through a coaxial bore in the tubular hub 25 and carries at one end, perpendicularly to its own axis, a driving yoke 31. The yoke 31 may be rod-shaped, for example, and is shown as being attached at its mid-point to the end of spindle 30, said yoke extending in opposite directions from said mid-point through the cam surface openings of the cam portion 28 and terminating at each end with a roller 32 adapted to engage driving slots 33 formed between two parallel lugs formed in the casing portion 20, whereby said yoke is rotated about its mid-point, perpendicularly to the axis of the spindle 30, by rotation of said casing. The yoke 31, which may be held to the spindle 30 by means of screw threads and a screw-threaded nut as shown in the drawing, is provided at points equidistant from its mid-point with a second set of rollers 34, or cam followers, adapted for engaging the respective cam surfaces 29, as may be seen more clearly in Fig. 3, said followers being disposed to rotate about the axis of said yoke. A spring 35, encircling the spindle 30, is compressed between a shoulder 36 formed in the bore of the hub 35 and a spring seat 37 at the end of said spindle opposite the yoke 31, for biasing said spindle outwardly and, consequently, due to pressure thereby exerted by the rollers 34 of said yoke 31 on the cam surface 29, the clutch member 26 into frictional engagement with the flywheel 23.

A cover cap 38 is fitted over the outer opening of the bore in the hub 25 and is provided with a check valve 39 for a reason to be hereinafter disclosed. Another cap 40 fits over the cover cap 38 for excluding foreign material and dirt from the control device 7. A vent 41 is provided in the cap 40.

The pilot valve device 9 is carried in a bore in the end of the axle 3 in coaxial alignment with the spindle 30 and is retained therein as by a screw connection shown, the valve device 9 being operable, in a manner to be hereinafter described, by inward axial movement of said spindle. This pilot valve device, briefly, comprises a valve 42 having a stem extending axially toward the spindle 30 but terminating short thereof, said valve being urged into a seated position by a spring 43. When unseated by inward axial movement of the spindle 30, the valve 42 allows communication between a chamber 44 enclosed by the casing portion 20 and a passageway 45 running coaxially through the axle 3 and connected by a flexible conduit 46 to the automatic valve device 8.

A gasket 47, compressed between the flange 21 of casing portion 20 and the inner race of the bearing 2, provides an air-tight seal between chamber 44 and the bearing 2 for keeping out foreign material or dirt from said bearings.

The valve device 8 is the usual spool type valve comprising a casing 48 which may be conveniently mounted on the non-rotative axle 3 in a suitable manner not shown. A pressure control chamber 49, defined partly by the casing 48 at one end of said casing and partly by a piston 50, is open to the conduit 46 leading to the pilot valve device 9. The piston 50 has affixed thereto and extending coaxially from the face opposite chamber 49, a unitary valve element in the form of a stem valve 51 for controlling communication between adjacent axially aligned chambers 52, 53, 54, 55 and 56. Chamber 52 is connected to pipe 15 leading to the valve device 5, chamber 53 is connected to pipe 16 leading to the brake cylinder device 6, chamber 54 is open to atmosphere through a port 57, chamber 55 is connected to a pipe 58 leading to the check valve device 12 and the pressure switch 11, while chamber 56 is open to chamber 52 by way of a passageway 59 provided in the casing 48.

The stem valve 51 comprises a series of lands 60, 61, 62 alternately and axially aligned with undercut portions 63, 64, the lands being adapted, when in a certain position, for engaging certain sealing rings disposed between the chambers 52, 53, 54, 55 and 56, and the undercut portions being adapted, when in a certain position, to allow communication between certain of said chambers, as will be presently described. A spring 65 disposed in chamber 49 biases the piston-valve 50—51 toward a normal position, in which it is shown in the drawing, and in which chamber 52 is open to chamber 53, while chamber 54 is open to chamber 55. The stem valve 51 is operable, as will be hereinafter described, to a release position in which communication between chambers 52 and 53 and between chambers 54 and 55 is disestablished, and communication between chambers 53 and 54 and between chambers 55 and 56 is established. Chambers 49 and 52, on opposite sides of the piston 50, are in constant communication with each other through a passageway 66 in said piston, with a choke 67 interposed in said passageway for restricting flow of fluid pressure from one side of the piston to the other.

Since a detailed description of the sanding device 10 is not considered essential to an understanding of the invention, it will suffice to say that said sanding device is interposed in an electrical circuit including the pressure switch 11, which, when subjected to the fluid pressure (in a manner to be hereinafter described), operates to close the circuit and cause the sanding device to drop sand in front of the wheels 1.

A timing volume 68 is interposed between the pressure switch 11 and the check valve devices 12. Upon admission of fluid pressure to any one of the pipes 58 (in a manner to be later described), the check valve device 12 will permit said fluid pressure to flow rapidly into the pressure switch 11 and the timing volume 68 which thus becomes charged. However, a choke 69 in each of the check valve devices 12 restricts back flow of fluid pressure from the timing volume 68 and, consequently, the pressure switch 11, so that upon cutoff of fluid pressure to pipe 58, the pressure switch 11 will remain closed for some time until the fluid pressure in said timing reservoir blows down through said chokes, thereby permitting the sanding operation to continue for some time after fluid pressure to pipe 58 has been cut off, depending upon the size of said timing volume and the chokes in said check valve devices.

It should be understood that in order to attain maximum efficiency of the above-described brake control apparatus, each of the vehicle wheels that is adapted to be braked should be equipped with a brake cylinder device 6, an inertia operable control device 7, a valve device 8, a pilot valve device 9 and a sanding device 10.

*Operation*

For purposes of simplicity, operation of the brake control apparatus embodying the invention will be described in connection with one set only of the wheels 1, which may be those of a truck trailer, for example, it being understood that operation of the equipment associated with the other sets of wheels on said trailer would be similar.

Let it be assumed that the vehicle is being driven along the highway under normal road conditions and that, therefore, the casing of the control device 7 is being correspondingly rotated by the wheel 1 in accordance with the rotative speed of said wheel. Rotation of the housing of the control device 7 drives the yoke 31 which in turn drives the clutch member 26 through the rollers 34 engaging the cam surfaces 29 of the cam portion 28. The clutch member 26, in turn, drives the flywheel 23 in accordance with the rotational speed of the wheel 1.

Let it now be assumed that the operator of the vehicle desires to effect a brake application and therefore operates the lever 14 of the brake valve device 5 to its application position. Fluid under pressure will thus be supplied, through pipe 15, to chamber 52 of the valve device 8 to thereby momentarily cause the piston 50 and stem valve 51 to be moved to its release position until sufficient fluid pressure can be built up in chamber 49 through the passageway 66 and choke 67 on the opposite side of said piston. When fluid pressure in chamber 49, acting in conjunction with the force of spring 65, has been built up sufficiently to overcome fluid pressure in chamber 52 acting on the opposite side of piston 50, said piston and the stem valve 51 will be moved to its normal position, above described, it being noted that fluid pressure will also be supplied, by way of conduit 46 and passageway 45, to the pilot valve device 9 whereby the valve 42 is retained in its seated position. It will be further noted that in the normal position of the stem valve 51, chamber 55 and consequently conduit 58 leading to the pressure switch device 11 are open to atmosphere by way of chamber 54 and vent 57 in the valve device 8. With the stem valve 51 in its normal position, fluid under pressure will be supplied by way of chambers 52 and 53, through conduit 16, to the brake cylinder device 6 to effect a brake application on the wheel 1.

Assuming that the braking force thus applied to wheel 1 is in excess of the permissible traction between the tread of said wheel and the highway surface, said wheel, and consequently the housing of the control device 7, will decelerate at an abnormally rapid rate toward a non-rotating or locked condition. The flywheel 23, however, having a tendency to continue to rotate, will overrun the housing of the control device 7 and the wheel 1 and in so doing will carry with it clutch member 26 so as to cause relative angular displacement between the cam portion 28 and the driving yoke 31. This angular displacement between the cam portion 28 and the yoke 31 will cause the rollers 34, journaled on said yoke, to ride up the cam surfaces 29 until said rollers engage the uppermost point of said cam surfaces, at which point the clutch member 26 will slip on the friction face of the flywheel 23. As the rollers 34 move up the cam surfaces 29, the spindle 30 will be moved axially against the opposing force of spring 35. Sufficient axial movement of the spindle 30 is thereby produced to cause the end of said spindle to engage the stem of valve 42 and unseat said valve against the opposing force of spring 43.

Unseating of valve 42 causes venting of chamber 49 of the valve device 8 by way of conduit 46, passageway 45, past the valve 42, through chamber 44, past the spindle 30, through the check valve 39 and port 41 in the cap 40. With fluid under pressure in chamber 49 of valve device 8 thus vented, the predominating pressure of fluid in chamber 52 on the opposite side of piston 50 resulting from the restricted rate of venting thereof through the choke 67 to chamber 49, will overcome the opposing force of spring 65 to thereby move the piston 50 and stem valve 51 to their release position. In the release position of the stem valve 51, communication between chambers 52 and 53 is cut off and communication between chambers 53 and 54 is established to thereby cut off further supply of fluid under pressure to conduit 16 and vent said conduit to atmosphere by way of vent 57. Venting of conduit 16 to atmosphere causes relief of fluid pressure from the brake cylinder device 6 and thereby release of the braking force on the wheel 1, which is then free to accelerate rapidly back toward ground speed of the vehicle. At this point it is desired to point out that the responsive action of the control device 7 is so instantaneous that when a slipping of the wheel occurs during a brake application, the brakes are released immediately before the wheel has an opportunity to attain a locked, that is sliding condition, it being understood that "slipping," as herein applied, refers to a rotating condition of the wheel in which the peripheral speed of the wheel, at a given instant, varies from linear ground speed.

At the time the brakes are released by operation of the piston 50 and the stem valve 51 of the valve device 8, as above described, communication between chambers 54 and 55 is disestablished by such operation of said stem valve. On the other hand, communication between chambers 55 and 56 is established and fluid under pressure may then flow to conduit 58 and the pressure switch device 11, by way of chamber 52, passageway 59, chamber 56 and chamber 55 to cause operation of the sanding device 10 in the manner heretofore described.

With the brakes released as above described, the wheel 1 will promptly accelerate back toward and attain ground speed of the vehicle, and incident to such acceleration of the wheel the cam followers 34 will roll back down the cam surfaces 29 to the lowermost point of said surfaces, at which time the flywheel 23 will again be driven by the clutch member 26 in accordance with the rotation of said wheel. It will be seen that incident to acceleration of the wheel 1, and consequently of the housing of the control device 7, back toward ground speed of the vehicle, the housing catches up to the flywheel, and since at that instant there is no slipping of the clutch member on the flywheel face, spring 35 acting through the spindle 30 and the driving yoke 31, will bias the cam followers 34 down the cam surfaces 29 to the lowermost point of said surfaces. The consequent axial movement of spindle 30 away from the stem of valve 42 will permit the spring 43 to bias valve 42 to its seated position, thereby terminating further venting of fluid pressure from chamber 49 of the valve device 8, as above described. Fluid pressure in chamber 49 of the valve device 8 will once again be promptly built up through passageway 66 and choke 67 from chamber 52 until the pressure in said chamber 49, acting in conjunction with spring 65, is sufficient to overcome the pressure on the opposite side of piston 50 in chamber 52 to return said piston and the stem valve 51 to their normal position. With the stem valve 51 in its normal position, fluid pressure will once again flow to conduit 15, as above described, to the brake cylinder device 6 to cause reapplication of the brakes automatically on the wheel 1. Unless the braking force acting on wheel 1 is excessive or should said wheel run into a slippery condition on the highway so that, while a brake application is in effect, said wheel tends to slide or lock once more to cause automatic release of the brakes as above described, the control of the brake apparatus will remain within the discretion of the vehicle operator through manual operation of the control valve device 5. With the stem valve 51 in its normal position, further supply of fluid pressure to the sanding device 10 will be terminated and the sanding action will also be terminated, after a certain interval of time, as above described, when the fluid pressure in the timing volume 68 reduces sufficiently to effect opening of the pressure switch 11. It will thus be seen that braking action of each set of wheels 1 and sanding is thus automatically controlled in a manner above described so that sliding of said wheels is positively prevented, especially under adverse conditions of road surfaces or excessive braking, without impairment of braking effect. It will also be seen that my improved anti-wheel-slide control device will function in the manner described for opposite direction of rotation of the vehicle wheels.

Having now described the invention, what I claim as new and desire to secure by Letters Patent is:-

1. A rotary inertia device comprising a rotatable housing, a flywheel rotatable within said housing, a yoke member movably interlocked within said housing so as to be driven in accordance with the rotational speed thereof and so as to be capable of axial movement relative thereto, slipping clutch means interengaged between said yoke member and said flywheel for transmitting driving torque from said yoke member to said flywheel, said clutch means being rotatively displaced relative to said yoke member upon a predetermined rate of change in speed of rotation of said housing, a cam portion carried by said clutch means having formed thereon a cam surface, and a cam follower carried by said yoke member for cooperatively engaging said cam surface in a manner to cause axial movement of said yoke member upon displacement of said clutch means rotatively relative to the yoke member; and control means operatively responsive to axial movement of the said yoke member.

2. A rotary inertia device as defined in claim 1, wherein the cam portion comprises a cylindrical portion extending coaxially from one end of the clutch means and having diametrically disposed openings in the side walls of said cylindrical portion, the edges of said openings providing continuous cam surfaces which cooperate with the cam followers carried by the yoke member in such a manner that the cam followers are prevented from disengaging the cam surfaces.

3. A rotary inertia device as defined in claim 1, wherein the yoke member comprises a rod-shaped member disposed in the housing with its axis in perpendicular and intersecting relation to the rotational axis of said housing, a roller carried at each end of said yoke member and rotatable about an axis coinciding with that of the yoke member, said rollers being adapted to be engaged by slots formed in the rotatable housing whereby said yoke may be driven by said housing and said rollers may provide for frictionless relative axial movement between said yoke member and said housing.

4. A rotary inertia device as defined in claim 1, in which the clutch means comprises a member coaxially rotatable within the housing and having a plurality of radially extending fingers for frictionally engaging one face of the flywheel for driving same or for slipping against said face when the rotational force of either the flywheel or the clutch member exceeds the frictional force between them.

5. A rotary inertia device for registering a predetermined rate of change of speed of an automotive vehicle wheel of the type in which the wheel is journaled at the end of a non-rotative axle, said device comprising a casing removably secured to the outboard face of the hub of the vehicle wheel and rotatable at all times in accordance with rotation of the wheel, said casing having a tubular shaft extending coaxially inward from the outboard end of the casing, a flywheel journaled on said tubular shaft, a clutch member journaled on said shaft adjacent said flywheel on the inboard side thereof and adapted to frictionally engage the adjacent face of the flywheel, a spindle extending coaxially through said tubular shaft, a rod secured to the inboard end of said spindle in substantially perpendicular relation to the axis of said spindle and shaft, a first set of rollers carried by said rod, means providing axially extending slots on diametrically opposite sides of said spindle within said housing within which said first set of rollers is guided for axial movement relative to the housing while being interlocked therewith so as to rotate with said housing, said clutch member having a circular tubular portion extending coaxially inward in which are diametrically opposite openings the edges of which constitute cam surfaces, said rod extending through said openings and carrying a second set of rollers which cooperatively engage the cam surfaces, spring means biasing said spindle outwardly so as to press the clutch member in frictional driving relation against the adjacent face of the flywheel while permitting relative rotative movement between said clutch member and rod upon a predetermined rate of change of speed of rotation of the housing, the cooperative action of the cam surfaces and the second set of rollers effecting axial movement of the rod incident to relative rotary movement between the clutch member and rod, and valve means carried on the end of the axle and with which said rod cooperates to effect operation thereof responsively to axial movement of the rod.

6. A rotary inertia device as defined in the preceding claim 5, further characterized in that the said valve means is carried in the outer end of a bore in the axle, through which bore fluid under pressure is released under the control of said valve means for a desired control purpose.

7. The combination comprising a vehicle wheel, a non-rotative axle upon which said wheel is journaled for rotation, a pilot valve device removably and coaxially carried in one end of said axle, a housing removably secured to the outer face of the hub of said wheel for rotation therewith and also enhousing said pilot valve device, a yoke member movably secured within said housing so as to be driven in accordance with the rotational speed thereof and so as to be capable of axial movement relative thereto, slipping clutch means interengaged between said yoke member and said flywheel for transmitting driving torque from said yoke member to said flywheel, said clutch means being rotatively displaced relative to said yoke member upon a predetermined rate of change in speed of rotation of said housing, and cooperating cam and cam follower means carried by said clutch member and said yoke member whereby, upon rotative displacement of said clutch member relative to said yoke member, axial displacement of said yoke member relative to said housing is effected for engaging and operating said pilot valve device.

8. In a brake control apparatus, the combination comprising a vehicle wheel, a non-rotative axle at one end of which said wheel is journaled for rotation, a brake application device responsive to fluid pressure and to relief of such pressure for effecting and releasing, respectively, a brake application on said wheel, a pilot valve device removably and coaxially carried in said one end of said axle, said pilot valve device including a valve stem and a valve having a seated and unseated position in which a passageway in said axle is cut off from and vented to, respectively, atmosphere, a housing removably and coaxially secured to the other face of the hub of said wheel for rotation therewith, said pilot valve device being enhoused by one portion of said housing adjacent said wheel-hub, a flywheel rotatable within said housing by being journaled on a hub extending coaxially and internally from another portion of said housing coaxially secured in opposite relation to said one portion, a spindle slidably received and extending through a coaxial bore in said internally extending hub, one end of said spindle extending toward but terminating short of said valve stem, a yoke member secured to said one end of said spindle and adapted to be engaged and driven by said housing but capable of moving axially, along with said spindle, relative to said housing, a slipping clutch member interengaged between said flywheel and said yoke member for transmitting driving torque from the latter to the former but capable of angular displacement relative to said yoke member upon overrunning or lagging of said flywheel relative to said housing in response to a slipping of said wheel, cam means carried cooperatively by said clutch member and said yoke member for effecting, upon angular displacement of said clutch member, axial movement of said spindle in one direction whereby said valve stem is engaged and said valve is unseated, means for biasing said spindle in the direction opposite said one direction, upon restoration of corresponding rotation between said flywheel and said housing in response to termination of said wheel-slip, for effecting seating of said valve, and valve means including a control chamber connected to said passageway and subjected to fluid pressure, said valve means having a normal position, in which it establishes communication through which said brake application device may be supplied with fluid pressure, and operable, upon venting of fluid pressure from said control chamber by way of said passageway, to a release position in which it establishes communication through which said brake application device is relieved of fluid pressure.

9. A brake control apparatus comprising, in combination, a brake application device operable in response to fluid pressure for effecting a brake application on a vehicle wheel and to relief of such pressure for releasing said brake application, a sanding device operable in response to electrical energization for causing sand to be discharged immediately in front of the vehicle wheel and in response to deenergization for stopping said discharge of sand, a fluid pressure operable switch device responsive to fluid pressure and to release of fluid pressure for effecting closing and opening, respectively, of an electrical circuit for energizing and deenergizing said sanding device, a source of fluid under pressure, conduit means providing for flow of fluid under pressure from said source to said brake application device and said switch device, first valve means interposed in said conduit means and having a control chamber charged with fluid under pressure from said conduit means, said valve means including a unitary valve element operable, in response to fluid pressure in said control chamber, to a normal position in which fluid pressure may be supplied to said brake application device and cut off from said switch device and, in response to venting of fluid pressure from said control chamber, to a release position in which said brake application device is relieved of fluid pressure and said pressure switch is supplied with fluid pressure, timing means operable automatically for causing said switch device to maintain said circuit closed for a certain interval of time upon operation of said first valve means to its release position, said timing means including a timing volume charged with fluid under pressure supplied to said switch device and check valve means for restricting the rate at which fluid under pressure is vented from said switch device upon operation of said first valve means to its first position, second valve means for controlling venting of said control chamber, and a control device for operating said second valve means, said control device being responsive to a slipping of said wheel for operating said second valve means to cause venting of said control chamber and responsive to cessation of said wheel-slipping for operating said second valve means to a position in which venting of said control chamber is cut off.

References Cited in the file of this patent
UNITED STATES PATENTS

| | | |
|---|---|---|
| 2,173,938 | Fitch | Sept. 26, 1939 |
| 2,198,022 | Aikman | Apr. 23, 1940 |
| 2,198,031 | Farmer | Apr. 23, 1940 |
| 2,540,753 | Newell | Feb. 6, 1951 |
| 2,573,386 | Berkoben et al. | Oct. 30, 1951 |
| 2,621,885 | Schmitt | Dec. 16, 1952 |
| 2,656,017 | Trevaskis | Oct. 20, 1953 |
| 2,713,989 | Bryant | July 26, 1955 |